United States Patent [19]
Matsuo et al.

[11] Patent Number: 4,528,151
[45] Date of Patent: Jul. 9, 1985

[54] PROCESS FOR PRODUCING A BLOW MOLDING RESIN

[75] Inventors: Yoshiho Matsuo; Ryoji Nishijima; Atsuhiko Yoshino; Takai Kawashima, all of Ichihara, Japan

[73] Assignees: Nissan Chemical Industries, Ltd.; Nissan Maruzen Polyethylene Company, both of Tokyo, Japan

[21] Appl. No.: 483,877

[22] Filed: Apr. 11, 1983

[30] Foreign Application Priority Data

Mar. 12, 1983 [JP] Japan ................... 58-40027

[51] Int. Cl.³ .................... B29C 17/14; B29F 3/00
[52] U.S. Cl. ...................... 264/83; 264/85; 264/141; 525/333.8; 525/388; 526/138
[58] Field of Search ............... 264/83, 85, 141–143; 525/333.8, 288; 526/138

[56] References Cited

U.S. PATENT DOCUMENTS

| 2,715,076 | 8/1955 | Wolinski | 264/83 |
| 3,242,159 | 3/1966 | Kaufman | 525/388 |
| 3,412,080 | 11/1968 | Smith et al. | 260/94.9 |
| 3,923,947 | 12/1975 | Cook | 525/333.8 |

FOREIGN PATENT DOCUMENTS

| 1037115 | 8/1958 | Fed. Rep. of Germany . |
| 2181994 | 7/1973 | France . |
| 901148 | 7/1962 | United Kingdom . |
| 979651 | 1/1965 | United Kingdom ............. 525/333.8 |

Primary Examiner—Jan Silbaugh
Attorney, Agent, or Firm—Oblon, Fisher, Spivak, McClelland & Maier

[57] ABSTRACT

A process for producing a blow molding resin comprises pelletizing a high density polyethylene prepared by means of a highly active Ziegler catalyst, at a temperature of at least 230° C. in the presence of air or oxygen so as not to change the average molecular weight and the molecular weight distribution.

6 Claims, No Drawings

PROCESS FOR PRODUCING A BLOW MOLDING RESIN

The present invention relates to a process for producing a blow molding resin. More particularly, the present invention relates to a process for producing a blow molding resin having superior surface appearance and processability from a high density polyethylene prepared by means of a Ziegler catalyst.

Heretofore, Ziegler-type catalysts have been developed to increase their catalytic activities in the production of a high density polyethylene and thereby to improve the economy of its production and the quality such as mechanical strength of the product. However, the improvement of the catalysts has been directed to narrow the molecular weight distribution of the high density polyethylene, which is not desirable as a blow molding resin. Under the circumstances, there have been a number of proposals for improvements.

For example, as an improvement of the reaction process, a two-stage polymerization or a three-stage polymerization has been used to broaden the molecular weight distribution. However, the polyethylene product thereby obtained does not necessarily satisfy the requirements for blow molding. Namely, while being superior in its mechanical strength, the blow molding resin obtained by the two-stage polymerization by means of highly active Ziegler catalysts had drawbacks such that the trimming of flashes formed by the blow molding was so difficult that automatic molding operation was not properly carried out, or the shearing heat generated during the molding operation was so great that the surface appearance of the molded product tended to be inferior. Accordingly, such a multi-stage polymerization does not by itself provide an ultimate improvement for the blow molding.

Further, it has been proposed to modify the molecular chain by a thermal oxidation method and thereby to complement the deficiency of the molding. Namely, a linear polyethylene is melted at a temperature within a range of from 160° to 280° C. and molecular oxygen is blown into it to modify the polyethylene to the one having a branched structure (BASF, Japanese Examined Patent Publication No. 6976/1962 claiming a priority date of Mar. 9, 1960 in West Germany). In this treatment, oxygen is supplied to a mixing and kneading apparatus for a predetermined period of time, whereby the average molecular weight will be reduced and the density will be considerably lowered to obtain a modified polyethylene which is soft and elastic. However, this method is essentially directed to the modification of the polyethylene and accordingly the properties of the original product will thereby be impaired to a large extent.

Furthermore, a method has been proposed in which a polyethylene is dissolved in an inert organic solvent and oxygen is introduced into the solution (BASF, Japanese Examined Patent Publication No. 17661/1962 claiming priority dates of July 31, 1959 and Sept. 9, 1959 in West Germany). According to this method, a high molecular weight resin once produced with use of a highly active catalyst will be modified to have a low molecular weight to adapt it for subsequent blow molding. This method is characterized by the treatment of the polyethylene in the presence of an inert organic solvent such as an aliphatic, cycloaliphatic or aromatic hydrocarbon at a temperature of from 70° to 200° C. for from 15 to 200 minutes. This involves procedural complications including various restrictions in the step of adding the solvent and the step of removing and purifying the solvent or in the manner of adding oxygen in the presence of the solvent. Depending upon the solvent chosen to be used, the entire process will have to be conducted under elevated pressure.

Further, it has been proposed to modify a usual polyolefin by decomposing it at a temperature within a range of the temperature at which its thermal decomposition takes place and its melting point, under a strong shearing force of the pelletizer (BASF, Japanese Examined Patent Publication No. 12376/1965 claiming priority dates of Aug. 31, 1962 and Feb. 23, 1963 in West Germany). This method relies heavily on the mechanical means and accordingly requires critical conditions in terms of the structure of the screw of the pelletizer and its operation. Further, the polyolefin thereby obtained has a low average molecular weight and a narrow molecular weight distribution, and accordingly it is not suitable as a resin for blow molding although it has a superior property for spinning.

As a result of an extensive research of the conventional processes with an aim to overcome the above-mentioned difficulties, it has been unexpectedly found that a resin for blow molding having excellent moldability and surface appearance can readily be obtained by pelletizing a high density polyethylene produced by means of a highly active Ziegler catalyst, at a temperature of at least 230° C. in the presence of air or oxygen without changing the average molecular weight and the molecular weight distribution.

Namely, the present invention provides a process for producing a blow molding resin which comprises pelletizing a high density polyethylene produced by means of a highly active Ziegler catalyst, at a temperature of at least 230° C. in the presence of air or oxygen without changing the average molecular weight and the molecular weight distribution. The oxygen concentration is preferably within a range of from 0.5 to 21% by volume. Further, at most 0.1 phr of an antioxidants may be added.

Now the present invention will be described in detail.

The polyethylene to be used in the present invention may be any polyethylene produced by a highly active Ziegler catalyst (PE 10 kg/gTi or more) including the one obtained by a multi-stage polymerization.

The temperature must be at least 230° C. If the temperature is less than 230° C., no distinctive improvement is obtainable.

The oxygen required as the atmosphere may not necessarily be molecular oxygen and in some cases atmospheric air will suffice. The oxygen concentration in the atmosphere during the pelletizing is at least 0.5% by volume. The greater the oxygen concentration is, the greater the effectiveness becomes. The purpose of the present invention can be attained even when the oxygen concentration is more than 21% by volume. However, it is most economical and practical to use a mixture of air and an inert gas as the oxygen source, and accordingly the oxygen concentration is preferably from 0.5 to 21% by volume.

At most 0.1 phr of an antioxidant may be added during the pelletizing although the addition is not essential. The antioxidant which may be used in the present invention, may be any antioxidant which is commonly used for preventing oxidation of polyethylene resins. There may be mentioned, for instance, phenol type antioxidants such as 2,6-di-tert-butyl-4-methyl phenol (commonly called BHT), octadecyl-$\beta$-(3,5-di-tert-butyl-4-hydroxyphenyl)-propionate (trade name Irganox 1076), pentaerythrityl-tetraxis [3-(3,5-di-tert-butyl-4-hydroxyphenyl)]propionate (trade name Irganox 1010), 4,4-butylidene-bis(6-tert-butyl-3-methylphenol) or 1,1,3-tris(5-tert-butyl-4-hydroxy-2-methylphenyl)butane and thiopropionate antioxidants such as dilauryl-thiodipropionate (commonly called DLTDP) or di-stearyl-thiodipropionate. The antioxidants are added in an amount within a range of not more than 0.1 phr. The amount of the addition of the antioxidants is determined depending upon the temperature and the oxygen concentration during the pelletizing.

It has been found that when the resin temperature is within a range of from 230° to 280° C., the desired effectiveness can be obtained with an addition of the antioxidants in an amount of at most 0.1 phr. Further, it has been found that when other conditions are met, good blow molding resins can be obtained even when no antioxidant is added.

Heretofore, it has been considered that the process of this type inevitably leads to a change of the average molecular weight and the molecular weight distribution of the polyethylene. Therefore, it is a quite unexpected discovery that according to the process of the present invention, no substantial change in the molecular weight distribution is observed as measured by G.P.C. (gel permeation chromatography). In general, the modification of polyethylene is determined by the change of the number average molecular weight and the molecular weight distribution and the reduction of the density. No such a change or reduction is observed by the pelletizing under the conditions specified in the present invention.

The effectiveness of the present invention is evident when compared with the resin pelletized in a nitrogen atmosphere which is commonly used in the conventional processes. A blow molding resin obtained by pelletizing a high density polyethylene powder produced by means of a highly active Ziegler catalyst, in a usual nitrogen atmosphere, is inferior in its flowability during the blow molding, whereby the extrusion rate under the same molding conditions tends to be low. In order to avoid this problem, it will be necessary to raise the resin temperature at the time of blow molding or to increase the screw revolution, whereby the cost of the energy required for the molding will be high and the resin temperature during the molding will inevitably be high. Further, the surface appearance of the molded products will not always be satisfactory and in many cases it will have a sharkskin and streaks along the flowing direction.

Whereas, it has been found that all of these deficiencies inherent to the blow molding resins produced with use of highly active Ziegler catalyst, can simultaneously be overcome by application of the process of the present invention. Namely, when a high density polyethylene powder prepared in the same manner is pelletized under the conditions specified by the present invention, the flowability of the resin at the time of blow molding will be improved. Further, the shearing heat generated by the screw at the time of blow molding will be reduced and the die head pressure and the motor current will also be reduced, whereby the economy for the blow molding can be improved. Further, it has been found that the surface appearance of the molded product will be improved to a large extent.

Now, the present invention will be described in further detail with reference to Examples.

Pelletizing

The pelletizer used in Examples is designed such that a polyethylene powder purged with a nitrogen atmosphere is introduced into a hopper of the pelletizer while an atmospheric gas adjusted to have a proper oxygen concentration with air and nitrogen gas, is introduced from a lower part of the hopper. The powder exposed to the above atmosphere is fed to the screw of the pelletizer, whereby it is pelletized. The temperature within the pelletizer was adjusted so that the resin temperature extruded from the die was from 230° to 280° C.

In the attached Table, the antioxidants are identified by the following numbers.
 (1) Irganox 1076
 (2) DLTDP
 (3) BHT Various properties of the pelletized sample were measured by the following methods.

The number average molecular weight and the molecular weight distribution were measured in 1,2,4-trichlorobenzene as a solvent at 135° C. by means of Model-150 C-type GPC manufactured by Waters Associates Ltd.

The density was measured by D method of JIS K7112 "Methods for Determining the Density and Specific Gravity of Plastics" with respect to a test piece prepared in accordance with JIS K6760 "Testing Methods of Polyethylene".

Blow molding

The blow molding was conducted under the following conditions.

The blow molding machine used was TPF-505 Model manufactured by Tahara Shoyei Engineering Co., Ltd., and the molding operation was conducted under the following conditions:
 Predetermined temperature—170° C.
 Extrusion rate—20 kg/hr
 Molding cycle—15 seconds
 Molded product—a bottle of 650 ml Under these conditions, the extrusion rate, the die head pressure and the resin temperature were monitored.

The raised temperature is defined by the following formula:

Raised temperature = resin temperature − predetermined temperature (170° C.)

The surface appearance of the molded products was determined by observation with naked eyes in accordance with the following standards:
 Excellent: Extremely good with a fine sharkskin without streaks.
 Good: The sharkskin is slightly rough, but no streaks were observed.
 Bad: No good with a rough sharkskin and streaks.

Further, the flash-removal property was determined by hands in accordance with the following standards:
 Excellent: Readily removable
 Good: Slightly hard
 Bad: Hardly removable

EXAMPLE 1

Effect of the addition of oxygen (Test Nos. 1 to 4 and 13)

The effect of the oxygen concentration was investigated under such conditions that the resin temperature during the pelletizing was 230° C. and no antioxidant was added.

At the oxygen concentration of 0.5% by volume, there is an indication of improvement. This effect is distinct when the oxygen concentration reaches 1% by volume and becomes more effective at the concentration of 21% by volume. Namely, with the increase of the oxygen concentration, the extrusion rate increases, die head pressure decreases and the raised temperature decreases. Further, the surface appearance and the flash-removal property become better. Further, the number average molecular weight, the molecular weight distribution and the density of the samples of Test Nos. 1 to 4 were identical with those of the samples of Test No. 13 within the measuring errors.

EXAMPLE 2

The effect of the resin temperature during the pelletizing (Test Nos. 3, 5, 6 and 15)

In Test Nos. 3, 6 and 15, the effect of the resin temperature during the pelletizing was investigated under such conditions that the oxygen concentration was 10% by volume and no antioxidant was added.

At the resin temperature within a range of from 230° to 280° C., the effects for improvements are distinct. Further, the surface appearance and the flash-removal property of the molded products were excellent. Namely, for the resins which have been pelletized at a temperature above 230° C., the extrusion rate increases, the die head pressure decreases and the raised temperature decreases, at the time of blow molding. Further, the number average molecular weight, the molecular weight distribution and the density of the pelletized samples produced at a temperature of from 230° to 280° C. were quite well in agreement with those of the sample of Test No. 15. Further, from the comparison of Test Nos. 5 and 6, it is evident that even when the pelletizing was conducted at the same resin temperature, the blow molding property substantially differs depending upon the oxygen concentration.

EXAMPLE 3

Effect of the addition of antioxidants (Test Nos. 6 to 12 and 14)

The effect of the amount of the addition of the antioxidant was investigated under such conditions that the resin temperature during the pelletizing was within a range of from 230° to 280° C. In this case, the effect for improvement is distinct within a range of the amount of the addition of the antioxidant being from 0 to 0.10 phr. Namely, with a decrease of the amount of the antioxidant, the extrusion rate increases and the die head pressure decreases. The smaller the amount of the addition of the antioxidant is, the better the surface appearance and the flash-removal property of the molded product become. Further, the number average molecular weight, the molecular weight distribution and the density of the samples of Test Nos. 6 to 12 and 14 were quite well in agreement with one another within a range of measuring errors.

Further, as is evident from Test Nos. 7 to 11, even when the kind of the antioxidant is changed to Irganox 1076, DLTDP or BHT, satisfactory molded products are obtainable so long as the amount of the antioxidant is not more than 0.10 phr. However, as shown by Test No. 14, it is not desirable to increase the amount of the antioxidant beyond this range i.e. 0.15 phr. Thus, from these results, it is evident that the upper limit of the amount of the addition of the antioxidant is 0.10 phr. Further, in Test No. 12, the processability for blow molding and properties of the sample were unsatisfactory since the pelletizing was conducted in the absence of oxygen although the resin temperature and the amount of the antioxidant were within a ranges specified in the present invention.

TABLE

| | Pelletizing conditions | | | Physical properties of the pelletized sample | | | Processability for blow molding | | | | Molded product | |
|---|---|---|---|---|---|---|---|---|---|---|---|---|
| Test No. | Oxygen concentration vol % | Resin temp. °C. | Antioxidant phr | Number average molecular weight × $10^4$ | Molecular weight distribution $\overline{M}w/\overline{M}n$ | Density g/cm$^3$ | Extrusion rate kg/hr · rpm | Die head pressure kg/cm$^2$ | Resin temp. °C. | Raised temp. °C. | Surface appearance | Flash removal property |
| Present invention | | | | | | | | | | | | |
| 1 | 0.5 | 230 | 0 | 1.72 | 8.5 | 0.953 | 0.259 | 269 | 202 | 32 | Excellent | Good |
| 2 | 1 | 230 | 0 | 1.75 | 8.5 | 0.954 | 0.270 | 250 | 201 | 31 | Excellent | Excellent |
| 3 | 10 | 230 | 0 | 1.75 | 8.4 | 0.953 | 0.305 | 240 | 198 | 28 | Excellent | Excellent |
| 4 | 21 | 230 | 0 | 1.72 | 8.6 | 0.953 | 0.308 | 235 | 197 | 27 | Excellent | Excellent |
| 5 | 1 | 280 | 0 | 1.74 | 8.4 | 0.953 | 0.260 | 260 | 202 | 32 | Excellent | Excellent |
| 6 | 10 | 280 | 0 | 1.73 | 8.6 | 0.953 | 0.300 | 240 | 197 | 27 | Excellent | Excellent |
| 7 | 10 | 280 | (1) 0.05 | 1.74 | 8.5 | 0.953 | 0.295 | 245 | 199 | 29 | Excellent | Excellent |
| 8 | 10 | 280 | (1) 0.10 | 1.74 | 8.4 | 0.953 | 0.281 | 250 | 200 | 29 | Excellent | Good |
| 9 | 10 | 280 | (2) 0.10 | 1.74 | 8.4 | 0.953 | 0.284 | 250 | 198 | 28 | Excellent | Good |
| 10 | 10 | 280 | (3) 0.10 | 1.74 | 8.5 | 0.953 | 0.288 | 255 | 200 | 30 | Good | Good |
| 11 | 10 | 230 | (1) 0.10 | 1.75 | 8.4 | 0.953 | 0.273 | 255 | 199 | 29 | Good | Good |
| Comparative test | | | | | | | | | | | | |
| 12 | 0 | 230 | (1) 0.10 | 1.73 | 8.5 | 0.953 | 0.255 | 260 | 203 | 33 | Bad | Bad |
| 13 | 0 | 230 | 0 | 1.73 | 8.4 | 0.953 | 0.248 | 265 | 203 | 33 | Bad | Bad |
| 14 | 10 | 280 | (1) 0.15 | 1.73 | 8.5 | 0.953 | 0.262 | 260 | 202 | 32 | Bad | Bad |
| 15 | 10 | 210 | 0 | 1.74 | 8.6 | 0.953 | 0.245 | 265 | 204 | 34 | Bad | Bad |

We claim:

1. A process for producing a blow molding resin which comprises pelletizing a high density polyethylene prepared by means of a highly active Ziegler catalyst, at a temperature of at least 230° C. in the presence of an oxygen containing gas so as not to change the average molecular weight and the molecular weight distribution, wherein the oxygen concentration during the pelletizing is within a range of from 0.5 to 21% by volume.

2. The process according to claim 1 wherein an antioxidant is incorporated into the high density polyethylene prior to pelletizing said polyethylene in the presence of air or oxygen, wherein the amount of said antioxidant incorporated is less than 0.1 phr.

3. The process according to claim 1 wherein said temperature is at least 230° C. and no greater than 280° C.

4. A process for producing a blow molding resin from a high density Ziegler-catalyzed polyethylene resin without changing the average molecular weight or molecular weight distribution of said resin, wherein said process comprises:

introducing a powder of said resin, which has been purged with nitrogen, into the hopper of a pelletizer;

introducing into the lower part of the hopper an atmospheric gas containing oxygen or air;

exposing said powder to said atmospheric gas; and then pelletizing said resin at a temperature of at least 230° C. by feeding said exposed powder to the screw of the pelletizer; wherein the oxygen concentration during the pelletizing is between 0.5 to 21% by volume.

5. The process according to claim 4 wherein an antioxidant is incorporated into the high density polyethylene prior to pelletizing said polyethylene, wherein the amount of said antioxidant incorporated is less than 0.1 phr.

6. The process according to claim 4 wherein said temperature is at least 230° C. and no greater than 280° C.

* * * * *